United States Patent
Feng et al.

(10) Patent No.: US 7,710,649 B2
(45) Date of Patent: May 4, 2010

(54) OPTICAL POLARIZER AND METHOD FOR FABRICATING THE SAME

(75) Inventors: Chen Feng, Beijing (CN); Kai-Li Jiang, Beijing (CN); Liang Liu, Beijing (CN); Xiao-Bo Zhang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 50 days.

(21) Appl. No.: 12/002,169

(22) Filed: Dec. 14, 2007

(65) Prior Publication Data
US 2008/0239489 A1 Oct. 2, 2008

(30) Foreign Application Priority Data
Mar. 30, 2007 (CN) ............... 2007 1 073765

(51) Int. Cl.
*G02B 5/30* (2006.01)
(52) U.S. Cl. ............... 359/500; 977/742; 977/746
(58) Field of Classification Search ............... None
See application file for complete search history.

(56) References Cited

U.S. PATENT DOCUMENTS 7,054,064 B2  5/2006  Jiang et al.

2004/0047038 A1*  3/2004  Jiang et al. ............... 359/486
2004/0071949 A1*  4/2004  Glatkowski et al. ....... 428/313.3
2006/0018018 A1*  1/2006  Nomura et al. ............ 359/495
2006/0121185 A1*  6/2006  Xu et al. ................... 427/163.1
2008/0198453 A1*  8/2008  LaFontaine et al. ........ 359/485

OTHER PUBLICATIONS

Spinning and processing continuous yarns from 4-inch wafer scale super-aligned carbon nanotube arrays,Adv. Mater. 2006, 18, 1505-1510,2006 WILEY-VCH Verlag GmbH & Co. KGaA, Weinheim.

* cited by examiner

Primary Examiner—Lee Fineman
(74) Attorney, Agent, or Firm—D. Austin Bonderer

(57) ABSTRACT

An optical polarizer includes a supporting member and a polarizing film supported by the supporting member. The polarizing film includes at least one layer of a carbon nanotube film, and the carbon nanotubes in a given carbon nanotube film are aligned in the same direction therein. A method for fabricating the optical polarizer includes the steps of: (a) providing a supporting member; (b) providing at least one layer of a carbon nanotube film, the carbon nanotubes in a given carbon nanotube film aligned along the same direction; and (c) adhering a given carbon nanotube film to the supporting member to form the optical polarizer.

17 Claims, 7 Drawing Sheets

OPTICAL POLARIZER AND METHOD FOR FABRICATING THE SAME

RELATED APPLICATIONS

This application is related to commonly-assigned applications entitled, "CARBON NANOTUBE FILM STRUCTURE AND METHOD FOR FABRICATING THE SAME", Ser. No. 12/002,129, filed Dec. 14, 2007, "ANODE OF LITHIUM BATTERY AND METHOD FOR FABRICATING THE SAME", Ser. No. 12/002,143, filed Dec. 14, 2007, and "FIELD EMISSION CATHODE AND METHOD FOR FABRICATING THE SAME", Ser. No. 12/002,144, filed Dec. 14, 2007. Disclosures of the above-identified applications are incorporated herein by reference.

BACKGROUND

1. Field of the Invention

The present invention relates to optical components and methods for fabricating the same and, particularly, to an optical polarizer and a method for fabricating the same.

2. Discussion of Related Art

The optical polarizing film is widely used for glare reduction and for increasing optical contrast in such products as sunglasses and liquid crystal displays (LCDs). One of the most common polarizers is a dichroic/dichromatic polarizer. The dichroic polarizer absorbs light beams of one polarization and transmits light beams of the other polarization. One typical type of dichroic polarizers is made by incorporating a dye into a polymer matrix, which is stretched in at least one direction. The diebroic polarizers can also be made by uniaxially stretching a polymer matrix and staining the matrix with a dichroic dye. Alternatively, a polymer matrix can be stained with an oriented dichroic dye. The dichroic dyes generally include anthraquinone and azo dyes, as well as iodine. Many commercial dichroic polarizers use polyvinyl alcohol as the polymer matrix for the dye.

However, the degree of polarization of an optical polarizing film made of the polymer material decreases when the optical polarizing film works at a temperature of or above about 50° C., or in a relatively moist environment.

Besides, the conventional optical polarizers can achieve good polarization property in a certain region of wavelength (e.g. microwave, infrared, visible light, ultraviolet, etc.), but can't have a uniform polarization property in the entire electromagnetic wavelength region.

What is needed, therefore, is to provide an optical polarizer and a method for fabricating the same, in which the above problems are eliminated or at least alleviated.

SUMMARY

In one embodiment, an optical polarizer includes a supporting member and a polarizing film supported by the supporting member. The polarizing film includes at least one layer of carbon nanotube film and the carbon nanotubes are aligned along the same direction.

In another embodiment, a method for fabricating the above-described optical polarizer includes the steps of: (a) providing a supporting member; (b) providing at least one layer of carbon nanotube film, the carbon nanotubes in the carbon nanotube film aligned along the same direction; and (c) adhering the carbon nanotube film to the supporting member to thereby form an optical polarizer.

Other advantages and novel features of the present optical polarizer and the related method for fabricating the same will become more apparent from the following detailed description of preferred embodiments when taken in conjunction with the accompanying drawings.

BRIEF DESCRIPTION OF THE DRAWINGS

Many aspects of the present optical polarizer and the related method for fabricating the same can be better understood with reference to the following drawings. The components in the drawings are not necessarily to scale, the emphasis instead being placed upon clearly illustrating the principles of the present optical polarizer and the related method for fabricating the same.

Figure 1:
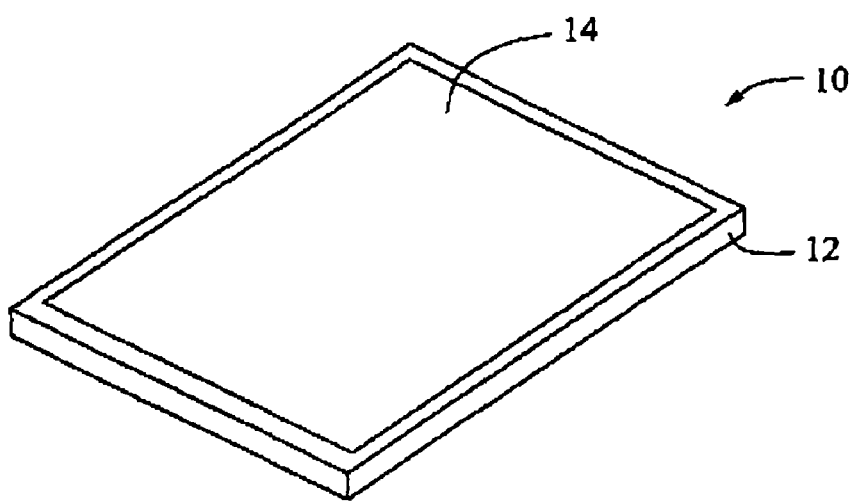
FIG. 1 is a schematic view of an optical polarizer, in accordance with a present embodiment.

Corresponding reference characters indicate corresponding parts throughout the several views. The exemplifications set out herein illustrate at least one preferred embodiment of the present optical polarizer and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present optical polarizer and the related method for fabricating the same.

Figure 6:
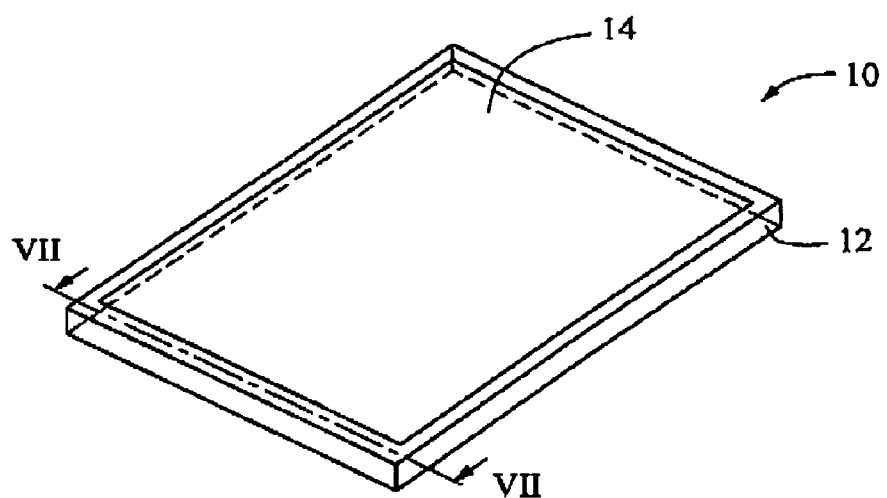
FIG. 6 is a schematic view of an optical polarizer showing a supporting member being a transparent substrate.
Figure 7:
FIG. 7 is a cross-sectional view of the supporting member shown in FIG. 6.

Referring to FIG. 1, an optical polarizer 10 in the present embodiment includes a supporting member 12 and a carbon nanotube film 14 supported by the supporting member 12. The supporting member 12 can, beneficially, be a frame or a transparent substrate. A schematic view of the carbon nanotube film 14 located on the transparent substrate can be seen in FIGS. 6 and 7. The carbon nanotube film 14 can, opportunely, be directly adhered to the frame or a surface of the transparent substrate. The carbon nanotube film 14 includes a plurality of successive aligned carbon nanotube bundles joined end to end. The carbon nanotube film 14 can, optionally, be a single layer film or a multi-layer film. The carbon nanotube bundles in different layers of the carbon nanotube film are aligned in the same direction.

A width of the carbon nanotube film 14 is in the approximate range from 1 centimeter to 10 centimeters. A thickness of the carbon nanotube film 14 is in the approximate range from 0.01 micron to 100 microns. The polarization property of the optical polarizer 10 relates to the number of layers of the carbon nanotube film 14. The greater the number of layers that are formed in the carbon nanotube film 14, the better the polarization property of the optical polarizer 10 generally will be.

Because the carbon nanotubes have uniform absorption ability in the entire electromagnetic wavelength region, the optical polarizer 10 has a uniform polarization property in the entire electromagnetic wavelength region. When light beams are transmitted into a front side of the optical polarizer 10, the light beams having a polarization parallel to the carbon nanotubes are absorbed by the carbon nanotubes, and the light beams having a polarization normal to the carbon nanotubes are transmitted through the optical polarizer 10. Accordingly, the polarized light beams are transmitted through the optical polarizer 10.

Figure 2:
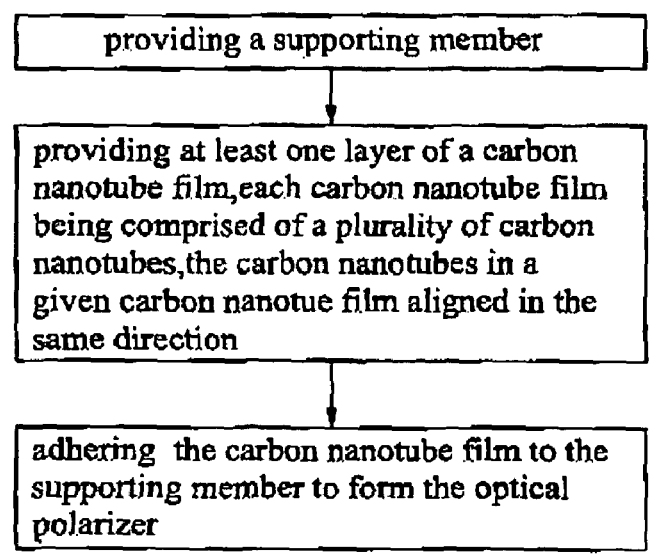
FIG. 2 is a flow chart of a method for fabricating the optical polarizer of FIG. 1.

Referring to FIG. 2, a method for fabricating the optical polarizer 10 includes the steps of: (a) providing a supporting member; (b) providing at least one layer of carbon nanotube film, the carbon nanotubes in the carbon nanotube film is aligned in the same direction; and (c) adhering the carbon nanotube film to the supporting member to form the optical polarizer.

In step (a), the supporting member can, advantageously, be a square metal frame using arbitrary metallic material (most suitably, a chemically and mechanically durable metal/alloy). The excess portion of the film outside the frame can be removed directly. In step (a), the supporting member can, rather appropriately, be a transparent substrate with the carbon nanotube film adhering thereon.

In step (b), at least one carbon nanotube film can, beneficially, be provided by pulling out from a super-aligned array of carbon nanotubes by the substeps of: (b1) providing an array of carbon nanotubes, quite suitably, providing a super-aligned array of carbon nanotubes; (b2) selecting a plurality of carbon nanotube segments having a predetermined width from the array of carbon nanotubes; (b3) pulling the carbon nanotube segments at an even/uniform speed to form the carbon nanotube film.

In step (b1), the super-aligned array of carbon nanotubes can be formed by the substeps of: (b11) providing a substantially flat and smooth substrate; (b12) forming a catalyst layer on the substrate; (b13) annealing the substrate with the catalyst at the approximate range of 700° C. to 900° C. in air for about 30 to 90 minutes; (b14) heating the substrate with the catalyst up to 500° C. to 740° C. in a furnace with a protective gas therein; and (b15) supplying a carbon source gas into the furnace for about 5 to 30 minutes and growing a super-aligned array of carbon nanotubes from the substrate.

In step (b11), the substrate can, beneficially, be a P-type silicon wafer, an N-type silicon wafer, or a silicon wafer with a film of silicon dioxide thereon. Preferredly, a 4-inch P-type silicon wafer is used as the substrate.

In step (b12), the catalyst can, advantageously, be made of iron (Fe), cobalt (Co), nickel (Ni), or any alloy thereof.

In step (b14), the protective gas can, beneficially, be made up of at least one of nitrogen ($N_2$), ammonia ($NH_3$), and a noble gas. In step (b15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, be in a height of about 200 to 400 microns and includes a plurality of carbon nanotubes paralleled to each other and approximately perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force.

In step (b2), quite usefully, the carbon nanotube segments having a predetermined width can be selected by using a tool (e.g., adhesive tape or another tool allowing multiple carbon nanotubes to be gripped and pulled simultaneously). In step (b3), the pulling direction is substantially perpendicular to the growing direction of the super-aligned array of carbon nanotubes.

More specifically, during the pulling step, as the initial carbon nanotube segments are drawn out, other carbon nanotube segments are also drawn out end to end, due to the van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner is able to formed to have a selectable, predetermined width.

The width of the carbon nanotube film depends on the size of the carbon nanotube array. The length of the carbon nanotube film is arbitrarily. In one useful embodiment, when the size of the substrate is 4 inches, the width of the carbon nanotube film is in the approximate range of 1 centimeter to 10 centimeters, and the thickness of the carbon nanotube film is in the approximate range of 0.01 to 100 microns.

It is noted that because the carbon nanotubes in the super-aligned array in step (a) has a high purity and a high specific surface area, the carbon nanotube film is adhesive. As such, in step (c), the first carbon nanotube film can be adhered to the frame directly. The carbon nanotube film is, beneficially, fixed on/to the frame at an edge thereof.

It will be apparent to those having ordinary skill in the field of the present invention that the size of the supporting member is depends on the actual needs/use. When the width of the supporting member is larger than that of the carbon nanotube film, a plurality of the carbon nanotube films can be adhered to the supporting member side by side and are parallel to each other.

It is to be understood that, in step (c), a plurality of carbon nanotube films can be adhered to the supporting member along the same direction and overlapped with each other to form the optical polarizer includes a multi-layer carbon nanotube film. The number of the layers is arbitrarily and depends on the actual needs/use. The layers of carbon nanotube film are combined (i.e., attached to one another) by van de Waals attractive force to form a stable multi-layer film.

Quite suitably, an additional step (d) of treating the carbon nanotube film in the optical polarizer with an organic solvent can, advantageously, be further provided after step (c).

In step (d), the carbon nanotube film in the optical polarizer can, beneficially, be treated by either of two methods: dropping an organic solvent from a dropper to soak an entire surface of side carbon nanotube film or immerging the supporting member with the carbon nanotube film thereon into a container having an organic solvent therein. The organic solvent is volatilizable and can be selected from the group consisting of ethanol, methanol, acetone, dichloroethane, chloroform, and combinations thereof. Quite suitably, the organic solvent is ethanol. After being soaked by the organic solvent, the carbon nanotube segments in the carbon nanotube film can at least partially shrink into carbon nanotube bundles due to the surface tension created by the organic solvent. Due to decrease of the specific surface via bundling, the coefficient of friction of the carbon nanotube film is reduced, but the carbon nanotube film maintains high mechanical strength and toughness. As such, the optical polarizer after treating process can be used conveniently.

Figure 3:
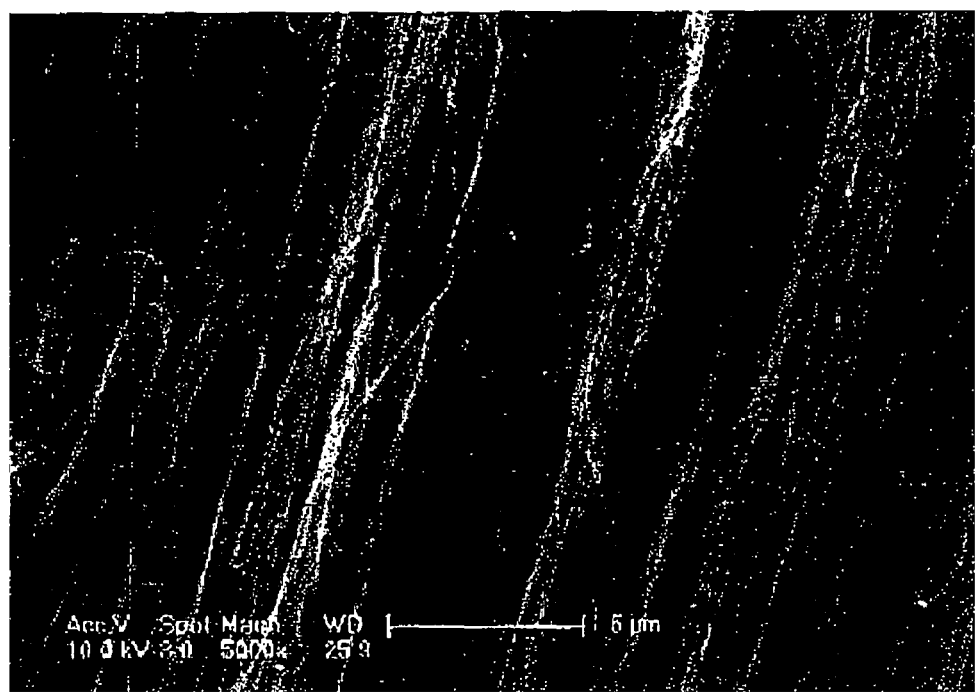
FIG. 3 shows a Scanning Electron Microscope (SEM) image of the optical polarizer, before treated with an organic solvent.
Figure 4:
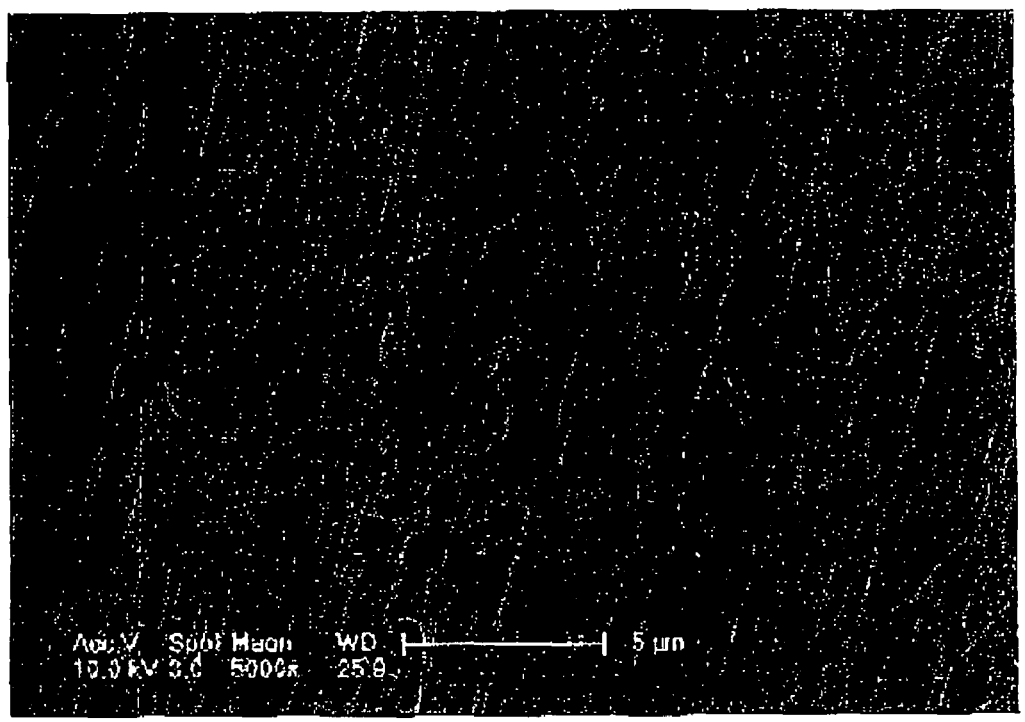
FIG. 4 shows a Scanning Electron Microscope (SEM) image of the optical polarizer, after treating with an organic solvent.

Referring to FIG. 3 and FIG. 4, Scanning Electron Microscope (SEM) images of the optical polarizer, before and after treating with an organic solvent, are shown. The carbon nanotubes in the optical polarizers are aligned. Adjacent carbon nanotube films are combined by van de Waals attractive force to form a stable multi-layer film.

Figure 5:
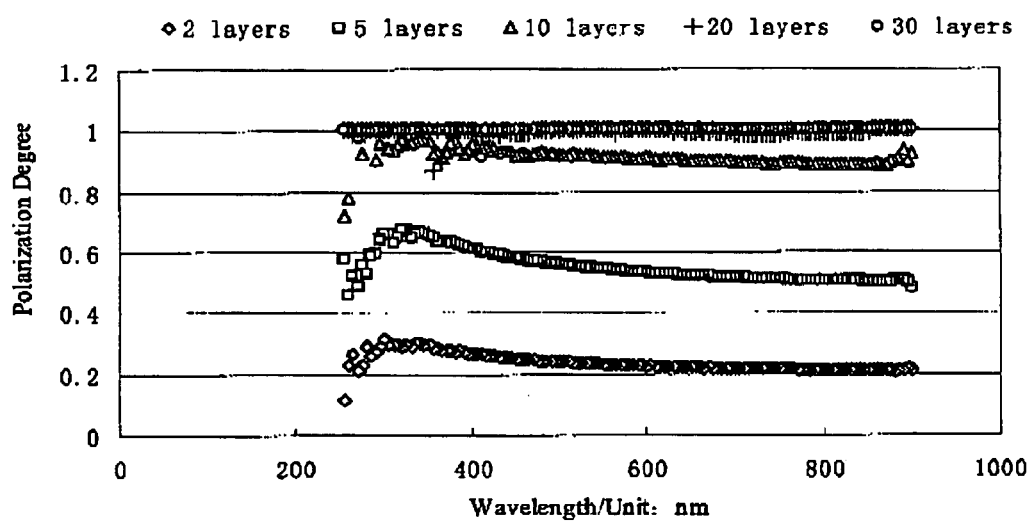
FIG. 5 is a graph showing the polarization degrees of the optical polarizers adopted different numbers of layers of carbon nanotube film in different wavelength regions.

Referring to FIG. 5, the polarization degrees in different wavelength regions of the optical polarizers adopting/using, respectively, 2, 5, 10, 20 and 30 layers of carbon nanotube film are shown. The polarization degree increases with the number of the layers of the carbon nanotube film in the optical polarizers. The optical polarizers employing fewer layers of the carbon nanotube film can only achieve good polarization properties in ultraviolet wavelength region. When the number of layers is increased, the optical polarizer can achieve good and uniform polarization properties in the entire wavelength region.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. An optical polarizer, comprising:
    a supporting member; and
    a polarizing film supported by the supporting member, the polarizing film comprises a plurality of layers of carbon nanotube films stacked on each other, and the layers of carbon nanotube films are secured to one another by van de Waals attractive force, each carbon nanotube film being comprised of a plurality of carbon nanotubes, the carbon nanotubes in a given carbon nanotube film all being aligned in a same direction.

2. The optical polarizer of claim 1, wherein the number of layers of the carbon nanotube films is at least 10.

3. The optical polarizer of claim 1, wherein a thickness of the carbon nanotube film is in the approximate range of 0.01 to 100 microns.

4. The optical polarizer of claim 1, wherein the carbon nanotube film comprises a plurality of successive and oriented carbon nanotube bundles.

5. The optical polarizer of claim 1, wherein the supporting member is one of a frame and a transparent substrate.

6. The optical polarizer of claim 1, wherein a width of the carbon nanotube film is in the approximate range from about 1 centimeter to about 10 centimeters.

7. A method for fabricating an optical polarizer, the method comprising the steps of:
    (a) providing a supporting member;
    (b) providing two or more carbon nanotube films, each carbon nanotube film being comprised of a plurality of carbon nanotubes, the carbon nanotubes in a given carbon nanotube film aligned in the same direction; and
    (c) stacking the two or more carbon nanotube films on the supporting member to form the optical polarizer; and
    (d) of treating the two or more carbon nanotube films with an organic solvent is further provided after step (c).

8. The method as claimed in claim 7, wherein the two or more carbon nanotube films are adhered to the supporting member along the same direction to form the optical polarizer.

9. The method as claimed in claim 7, wherein the step (b) further comprising the substeps of:
    (b1) providing an array of carbon nanotubes;
    (b2) selecting a plurality of carbon nanotube segments having a predetermined width from the array of carbon nanotubes; and
    (b3) pulling the carbon nanotube segments at a uniform speed and perpendicular to the growing direction of the array of the carbon nanotubes, in order to form a given carbon nanotube film.

10. The method as claimed in claim 9, wherein the step (b1) further comprises growing the array of the carbon nanotubes to a height of about 200 to about 400 microns.

11. The method as claimed in claim 7, wherein the two or more carbon nanotube films in the optical polarizer is treated by dropping the organic solvent from a dropper to soak the entire side surface of the two or more carbon nanotube films or by immerging the supporting member with the two or more carbon nanotube films thereon into a container having the organic solvent therein.

12. The method as claimed in claim 11, wherein the organic solvent is selected from the group consisting of ethanol, methanol, acetone, dichloroethane, chloroform, and combinations thereof.

13. The method as claimed in claim 7, wherein a width of the carbon nanotube film is in the approximate range from about 1 centimeter to about 10 centimeters.

14. The method as claimed in claim 7, wherein the carbon nanotube film in step (b) comprises a plurality of carbon nanotube segments, and the carbon nanotube segments at least partially shrink into carbon nanotube bundles after step (d).

15. The method as claimed in claim 7, wherein in step (c), ten or more carbon nanotube films are stacked on the supporting member to form the optical polarizer.

16. An optical polarizer, comprising:
    a supporting member; and
    a polarizing film supported by the supporting member, the polarizing film comprising a multi-layer film, the multi-layer film comprising two or more stacked carbon nanotube films attached to one another by van de Waals attractive force, each carbon nanotube film being comprised of a plurality of carbon nanotubes, the carbon nanotubes in the carbon nanotube film are substantially aligned along a same direction.

17. The optical polarizer of claim 16, wherein a width of the carbon nanotube film is in the approximate range from about 1 centimeter to about 10 centimeters.

* * * * *